Patented Jan. 13, 1948

2,434,271

UNITED STATES PATENT OFFICE 2,434,271

METHOD OF INJECTION MOLDING CERAMIC BODIES USING THERMOPLASTIC BINDER

Glenn N. Howatt, United States Army, Metuchen, N. J.

No Drawing. Application August 30, 1944, Serial No. 551,942

5 Claims. (Cl. 25—156)

(Granted under the act of March 3, 1883, as amended April 30, 1928; 370 O. G. 757)

The invention described herein may be manufactured and used by or for the Government governmental purposes, without the payment of any royalty thereon.

This invention relates to methods of forming ceramic materials, and more particularly to processes for forming ceramic materials of various shapes and sizes by injection molding.

Heretofore ceramic pieces for electrical and electronic uses have been machined and formed from bulk, necessitating costly and time-consuming machining operations to provide the necessary shapes and configurations required in coil forms, etc.

My invention obviates the necessity for costly and time-consuming machining and forming operations in that the necessary ceramic bodies may be formed to shape in operation.

It is an object of my invention to produce ceramic bodies of intricate form in final shape in one operation, eliminating the necessity of machining the ceramic pieces.

It is another object of my invention to provide a method enabling ceramic materials to be formed in one operation by injection molding.

Other objects and advantages will become apparent in the following specification of embodiments of the invention.

In carrying out my invention, the ceramic material, which may be glass, steatite, porcelain, etc., is prepared in a dry comminuted form and mixed with a suitable thermoplastic material and plasticizer. Thermoplastic materials suitable for this purpose include ethyl cellulose, polystyrene, and waxes of both high and low melting points. Plasticizers suitable for use in my invention include pine oil, and solvent resins which are known to the trade as Hercolyn, a methyl abietate, a liquid resin resistant plasticizer and solvent. The amount of thermoplastic material plus the plasticizer should be from 5 to 20 percent of the entire weight of the mix. The mixing of the ceramic, thermoplastic and plasticizer may be accomplished in two ways. In one method of mixing, the thermoplastic material or binder (now including the plasticizers) may be melted and added to the comminuted ceramic body in a heated muller, roll, or blade type of mixer, or, the materials may all be added cold and heated in the mixer to get uniform distribution. The second manner of mixing comprises dissolving the thermoplastic material and the plasticizer mediums in a suitable solvent, and mixing the resulting solution with the ceramic body (the latter in its dry comminuted form) while cold, in a muller, or blade type mixer.

In carrying out this method, the ceramic body, together with the thermoplastic material and plasticizer, is prepared in either one of the two manners described above. The material should be well comminuted so that it will pass through a screen of approximately ⅛" mesh. The prepared material is then fed into an injection molding machine of a type known to the art, which may be a commercially available device such as the Watson-Stillman Model 6a, 8a, 12a, or 16a or other suitable equipment of like character. The mix is fed into the injection molding die under sufficient heat and pressure to permit the mix to flow readily into the die. A temperature range of from 200° C. to 400° C. together with a pressure of up to 30 tons per square inch, has been found sufficient to permit the mix to be rendered in a readily flowable condition.

After the molded piece is removed from the die, the fins and die marks are removed in the usual manner. The molded piece is then subjected to the finishing operations of glazing and firing. During the firing operation, the thermoplastic material and the plasticizer which together are utilized as a binder, are reduced to a gas and oxidized. This gas passes off while the ceramic is in a porous condition and thus leaves no residue in the finished article. The finished piece is ready for use without any further machining or forming operation.

An alternative method to the one described above will now be described: The ceramic body in comminuted form is mixed either wet or dry with a suitable binder and solvent in a muller or blade type of mixer. The binder may be a soluble material such as polyvinyl alcohol or sodium-carboxy-methyl-cellulose, waxes or soluble resins. Suitable solvents may include water, toluene, pine-oil and the abietate previously named. The weight of the binder should be from 2.5% to 10% of the total weight of the mix. The weight of the binder plus the solvent should be from 10% to 30% of the total weight of the mix. In this modification, the materials thus prepared are then fed into an injection molding die of the type previously mentioned, or other suitable equipment, utilizing pressure but no heat to make the material flow into the die. After the piece is removed from the die, the fins and die marks are removed in the usual manner and the piece is subjected to the finishing operations of drying, glazing and firing. The solvent is removed from the material during the drying stage, while the binder is removed from the ceramic body in the form of gases during the firing operation, leaving no residue in the finished article.

In order to eliminate striations and rectify other molding difficulties, the molding operation may be done in a de-aired die.

It has been determined that less pressure may be utilized in extruding the mix into the die if the mix is subjected to vibration. A vibrator may be mounted directly upon the die or upon the conduit immediately preceding the die, or any other suitable location. The use of insufficient pressure in extruding the mix may lead to the development of small cracks in the finished article, but these cracks may be eliminated by vibrating the mix in the manner just described.

It is thus seen that I have provided a new process for forming ceramic bodies of various shapes in one molding operation obviating the necessity of expensive and time-consuming machining operations. It is obvious that modifications of my invention may be resorted to within this scope of the appended claims.

I claim:

1. In the method of forming ceramic bodies: the steps comprising dissolving a thermoplastic in a solvent more volatile than the thermoplastic, intermixing with the solution a comminuted ceramic material to form a final mix, confining the mix, applying heat thereto to raise the temperature of the mix above the melting temperature of the thermoplastic and above the boiling point of the said solvent, applying to the mix pressure above the liquifying pressure of at least said solvent at the temperature of the mix, injection molding the mix while maintaining said applied pressure, removing the molded product and baking the same.

2. In the method of forming ceramic bodies: the steps comprising dissolving a thermoplastic and a plasticizer in a solvent more volatile than either, intermixing with the solution a comminuted ceramic material to form a final mix, confining the mix, applying heat thereto to raise the temperature of the mix above the melting temperatures of the thermoplastic and plasticizer and above the boiling point of the said solvent at least, applying to the mix pressure above the liquifying pressure of at least said solvent at the temperature of the mix, injection molding the mix while maintaining said applied pressure, removing the molded product and baking the same.

3. The method of claim 2 wherein the said plasticizer is a solvent of the said thermoplastic.

4. The method of claim 2 including releasing gases from the mold in advance of the mix.

5. The method of claim 1 including releasing gases from the mold in advance of the mix.

GLENN N. HOWATT.

REFERENCES CITED

The following references are of record in the file of this patent:

UNITED STATES PATENTS

| Number | Name | Date |
| --- | --- | --- |
| 1,374,493 | Dimitri et al. | Apr. 12, 1921 |
| 1,541,869 | Sprenger | June 16, 1925 |
| 1,977,698 | Scott | Oct. 23, 1934 |
| 2,121,018 | Carter et al. | June 21, 1938 |
| 2,122,960 | Schwartzwalder | July 5, 1938 |
| 2,305,877 | Klingler et al. | Dec. 22, 1942 |

FOREIGN PATENTS

| Number | Country | Date |
| --- | --- | --- |
| 489,981 | Great Britain | Aug. 8, 1938 |